Jan. 1, 1952
J. KACENA
2,580,551
SCRAPER-BLADE ASSEMBLY FOR PLASTER MIXERS AND THE LIKE
Filed March 8, 1951
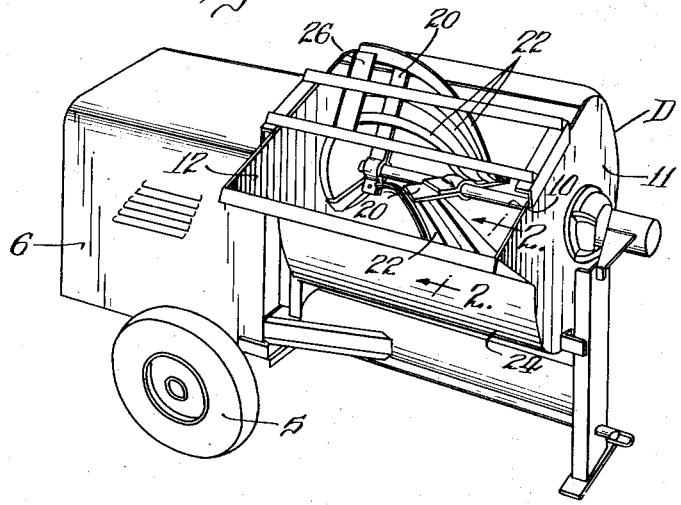
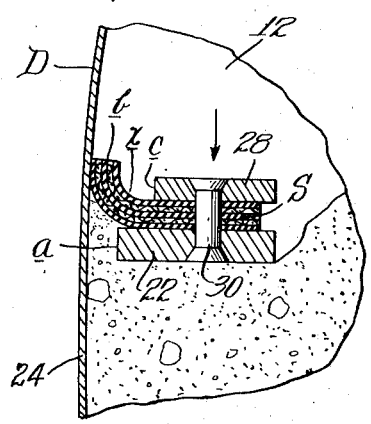
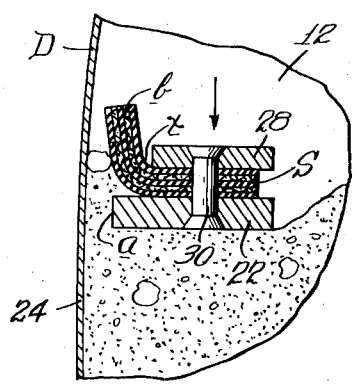
INVENTOR.
Jerome Kacena
BY
Banning & Banning
Attys.

Patented Jan. 1, 1952

2,580,551

UNITED STATES PATENT OFFICE 2,580,551

SCRAPER-BLADE ASSEMBLY FOR PLASTER MIXERS AND THE LIKE

Jerome Kacena, Chicago, Ill.

Application March 8, 1951, Serial No. 214,591

4 Claims. (Cl. 259—178)

This invention, which relates generally to a mixer for plaster and the like, is particularly concerned with a scraper-blade assembly and its mounting for movement through a fixed path within a drum which contains the material to be mixed. Each scraper is carried by an associated blade in such a way as to engage a wall of the mixer and, when necessary, recede therefrom to pass an oversize object contained in the mix.

In mixers for plaster and the like the ingredients are supposedly reduced to a degree of fineness which will avoid difficulty for a wall-engaging scraper, when operatively advanced through a predetermined path within the drum. Such a scraper if made of resilient material—rubber for example—is counted on to yield, as required, when passing slight irregularities in the size or consistency of the ingredients which happen to lie between the scraper and the drum wall engaged thereby. Experience has shown, however, that occasionally oversized pieces of material find their way into the mix, and when engaged by a resilient scraper which is carried along by its associated blade will produce a cut or tear in the scraper because its mounting will not permit of a sufficient yielding. It is with such a condition that I am here concerned, and which is adequately dealt with by the improved scraper-blade assembly of this invention of which a suggestive embodiment is illustrated in the accompanying drawing in the manner following:

Figure 1 is a view in perspective of a conventional power-operated mixer for plaster and the like, looking toward the open top of its drum wherein is shown a rotatable shaft with attached blades, each equipped with a resilient scraper mounted according to this invention;

Fig. 2 is a fragmentary detail in section, greatly enlarged, taken on line 2—2 of Fig. 1, showing the scraper-blade assembly as it appears under normal conditions when being moved through the mix; and Fig. 3 which is a similar view shows the scraper-blade assembly in a position of yielding to an encountered oversized object in the mixer.

There is illustrated in Fig. 1 an on-the-job power-operated mixer movable upon a pair of wheels 5 between which is supported a housing 6 wherein is a small power plant from which is extended a shaft 10 that is journaled at the end walls 11 and 12 of a drum D which is open on its top and front. The shaft 10 which traverses the drum, longitudinally thereof, mounts a plurality of radial arms 20 which are interconnected by a plurality of spiral blades 22 (three being the number shown) extending lengthwise of the shaft and outwardly therefrom but eccentrically thereof. Certain of these spiral blades lie close to the drum wall which extends lengthwise thereof between its ends 11 and 12, and which is curved at 24 through an extended arc which is concentric with the axis of the shaft 10. The ends of each set of blades which are proximate to the drum and walls 11 and 12 are interconnected by a straight blade 26.

A construction answering to the description up to this point has heretofore been known. The feature of invention with which I am here concerned relates to the application to each blade, which is inflexible, of a resilient scraper with the special mounting now to be detailed. Figs. 2 and 3 may be taken as representative of the improved scraper-blade assembly whether applied to the straight blades 26 at the end of the drum or one of the spiral blades 22 intermediately thereof.

The blade 22 shown in Fig. 2 is positioned radially of the drum axis with its longitudinal edge $a$ extending parallel with the proximate wall 24 of the drum D but in spaced relation thereto. The distance of separation is approximately the same as is the width of the heavy resilient scraper S, also disposed radially of the drum axis, which is carried by the blade. This scraper is elongated, in the form of a strip, and its free end portion $b$ is extended beyond the blade edge $a$ and then curved at $x$ through an arc which may be as much as 90° to engage the drum wall 24. The scraper side which confronts its supporting blade also confronts the drum wall 24, and the extent of its surface in engagement therewith may vary from the flatwise position shown in Fig. 2 to one wherein it is only the outer edge of the scraper in such engagement, depending upon variable factors which are encountered in manufacturing practice. The tension of the scraper is such that is maintained against the wall of the drum with a substantial pressure but with freedom to yield, as required, to permit passage of the usual particles between itself and the drum wall. The scraper is desirably formed of laminations of rubber, or rubber composition, interleaved with laminations of fabric or other suitable material which will provide strength and toughness to a requisite degree. Such a scraper is characterized by a substantial thickness—perhaps ¼" or so—and will not readily bend through a short radius curvature.

The distance of separation between the blade edge $a$ and the drum wall is approximately equal to the scraper thickness. On the scraper side opposite the blade and radially of the drum axis is positioned an elongated reinforcing strip 28 having an edge *c* which extends parallel with the drum wall 24 but spaced therefrom by a distance which is two or more times that of the edge *a* of the blade. The resilient scraper is, therefore, supported upon each of its opposite sides throughout an extended portion of its area, but this support on the strip side terminates a substantial distance from the inside of its curve *x*.

A plurality of rivets 30 or other suitable fastening devices are extended through the strip 28, scraper S, and blade 22, with the opposite ends of the rivets headed to interconnect these three parts fixedly in a unitary relation. Each scraper is therefore held fixedly upon the blade in such a position as to present one of its sides in pressure engagement with the proximate wall of the drum, and to perform a scraping action thereupon when the shaft 10 is revolved.

One normal position of the scraper is indicated in Fig. 2, where it is shown to be pressure-engaged flatwise with the drum wall 24. However, when an oversized object in the mixer is caught between the scraper S and the drum wall 24, damage will be inflicted upon the scraper unless it is free to yield sufficiently to safely pass the object. According to the present construction, the scraper may yield as indicated in Fig. 3 to the extent of providing between itself and the drum wall 24 a passageway of substantially the same width as that which obtains between the inflexible blade and the wall. If the blade itself can pass the object, then the scraper may also do so since it is free to yield for a distance which corresponds closely with the spacing of the blade edge *a* from the wall 24. This yielding is possible because of the special mounting which utilizes a reinforcing strip whose edge *c*, proximate to the drum wall 24, is spaced away therefrom a distance at least twice that of the edge *a* of the blade 22, thus providing sufficient clearance for the scraper curve *x* to shift inwardly as shown.

I claim:

1. In a mixer for plaster and the like wherein is a drum having a wall curved about the drum axis for containing material to be mixed and a blade disposed radially of the drum axis and movable through a fixed path within the drum with one of its edges proximate to, but slightly spaced from and parallel with its curved wall, the feature of improvement which consists in an elongated resilient scraper disposed radially of the drum axis and having one of its sides positioned flatwise upon the blade and extended outwardly therefrom and then curved, counter to its own tension, to present normally the same scraper side in flatwise pressure engagement with the proximate drum wall, an elongated reinforcing strip disposed flatwise upon the scraper side opposite that which contacts the blade and extended lengthwise of the scraper but spaced from the proximate blade edge by a distance no less than the thickness of the scraper to provide clearance wherein the position of the scraper curved portion may be shifted further from the proximate drum wall to accommodate therebetween an oversized object, and means fixedly interconnecting the strip, scraper, and blade in unitary relation.

2. In a mixer for plaster and the like wherein is a drum having a wall curved about the drum axis for containing material to be mixed and a blade disposed radially of the drum axis and movable through a fixed path within the drum with one of its edges proximate to, but slightly spaced from and parallel with its curved wall, the feature of improvement which consists in an elongated resilient scraper disposed radially of the drum axis and having one of its sides positioned flatwise upon the blade and extended outwardly therefrom and then curved, counter to its own tension, to present normally the same scraper side in flatwise pressure engagement with the proximate drum wall, the scraper having a thickness corresponding generally with the spacing of the blade from the said wall, an elongated reinforcing strip disposed flatwise upon the scraper side opposite that which contacts the blade and extended lengthwise of the scraper but spaced from the proximate blade edge by a distance no less than the thickness of the scraper to provide clearance for the scraper to shift the position of its curved portion further from the proximate drum wall to accommodate therebetween an oversized object, and means fixedly interconnecting the strip, scraper, and blade in unitary relation.

3. In a mixer for plaster and the like wherein is a drum having a wall curved about the drum axis for containing material to be mixed and a blade disposed radially of the drum axis and movable through a fixed path within the drum with one of its edges proximate to, but slightly spaced from and parallel with its curved wall, the feature of improvement which consists in an elongated resilient scraper disposed radially of the drum and having a thickness about equal to the space between the blade and the proximate drum wall and having one of its sides positioned flatwise upon the blade and extended outwardly therefrom and then curved, counter to its own tension, to present normally the same scraper side in flatwise pressure engagement with the proximate drum wall, an elongated reinforcing strip disposed flatwise upon the scraper side opposite that which contacts the blade and extended lengthwise of the scraper but spaced from the proximate blade edge by a distance no less than the thickness of the scraper to provide clearance wherein the position of the scraper curved portion may be shifted further from the proximate drum wall to accommodate therebetween an oversized object, and means fixedly interconnecting the strip, scraper, and blade in unitary relation.

4. In a mixer for plaster and the like wherein is a drum having a wall curved about the drum axis for containing material to be mixed and a blade disposed radially of the drum axis and movable through a fixed path within the drum with one of its edges proximate to, but slightly spaced from and parallel with its curved wall, the feature of improvement which consists in an elongated resilient scraper disposed radially of the drum and having a thickness no greater than the space between the blade and the proximate drum wall and having one of its sides positioned flatwise upon the blade and extended outwardly therefrom and then curved, counter to its own tension, to present normally the same scraper side in flatwise pressure engagement with the proximate drum wall, the scraper having a thickness corresponding generally with the spacing of the blade from the said wall, an elongated reinforcing strip disposed flatwise upon the scraper side opposite that which contacts the blade and extended lengthwise of the scraper but spaced from the proximate drum wall a distance at least twice that of the spacing between the blade and the said wall to provide clearance for the scraper to shift the position of its curved portion further from the proximate drum wall to accommodate therebetween an oversized object, and means fixedly interconnecting the strip, scraper, and blade in unitary relation.

JEROME KACENA.

REFERENCES CITED

The following references are of record in the file of this patent:

UNITED STATES PATENTS

| Number | Name | Date |
|---|---|---|
| 1,630,789 | Essick | May 31, 1927 |
| 1,630,790 | Essick | May 31, 1927 |
| 2,525,573 | Zicovich | Oct. 10, 1950 |